OR 3,656,837

T 30 7…

Sandbank

[15] 3,656,837

[45] Apr. 18, 1972

[54] SOLID STATE SCANNING BY DETECTING THE RELIEF PROFILE OF A SEMICONDUCTOR BODY

[72] Inventor: Carl Peter Sandbank, Bishop's Stortford, England

[73] Assignee: ITT Industries, Inc., New York, N.Y.

[22] Filed: Oct. 14, 1970

[21] Appl. No.: 80,616

[30] Foreign Application Priority Data

Oct. 21, 1969 Great Britain ......................51,474/69

[52] U.S. Cl. ........................350/161, 178/7.3 D, 250/237 G, 350/162 SF

[51] Int. Cl. ..........................................................G02f 1/28

[58] Field of Search ............250/211 R, 237 R, 211 J, 237 Q, 250/213, 199; 307/311; 356/129; 350/160, 150, 151, 161, 162 SF; 178/7.3 D, 7.87, 7.88

[56] References Cited

UNITED STATES PATENTS

| | | | |
|---|---|---|---|
| 2,000,379 | 5/1935 | Deisch | 178/7.3 D |
| 2,155,660 | 4/1939 | Jeffree | 178/7.3 D |
| 3,041,395 | 6/1962 | Mast | 178/7.88 |
| 3,385,927 | 5/1968 | Hamann | 178/7.87 |
| 3,504,117 | 3/1970 | Dueringer | 350/162 SF |
| 3,582,185 | 6/1971 | Steiger | 350/161 |

*Primary Examiner*—James W. Lawrence
*Assistant Examiner*—D. C. Nelms
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A solid state scanning system includes a body of semiconductive material, such as cadmium sulfide, which exhibits moving high field instability effects, and a light projection system having Schlieren optics to detect surface disturbances caused by a propagating high field domain nucleated within the semiconductor body. The light is preferably directed onto the semiconductor surface by a plurality of louvered mirror strips which also detect the light reflections therefrom. The system may also include a display means to show the relief profile of the surface disturbances in the form of a raster of brightness information representing variations in the voltage across the domain which occurs during the propagation. A layer of a high coupling constant material can be provided on the device to enhance the disturbance effect. A liquid or plastic film can also be used on the device to introduce memory in the system.

8 Claims, 2 Drawing Figures

Inventor
CARL P. SANDBANK
By [signature]
Attorney

SOLID STATE SCANNING BY DETECTING THE RELIEF PROFILE OF A SEMICONDUCTOR BODY

BACKGROUND OF THE INVENTION

1. Field of the Invention

The invention relates to solid state scanning systems utilizing semiconductor devices which include semiconductor material exhibiting moving high field instability effects.

2. Description of the Prior Art

If a body of piezo-electric semiconductor material, for example cadmium sulfide, is subjected to a steady electrical field exceeding a critical value the resultant current flowing through the body contains an oscillatory component of frequency determined by the transit of a space charge distribution, i.e., a high field domain between the body contact areas. The high field domains are formed by acoustic amplification processes in semiconducting material which produce sharp current saturation effects and the trapping of electrons in a traveling domain of high acoustic amplitude. This phenomenon has been reported for cadmium sulfide by W. H. Haydl and C. F. Quate (Stanford University Microwave Laboratory Report — M.L. 1403, January 1966). The frequency of oscillation is determined primarily by the length of the current path through the body.

The term "semiconductive material exhibiting high field instability effects" is used herein to include any material exhibiting the effects as defined in the preceding paragraphs or exhibiting similar domain-transit phenomena which may be based on somewhat different internal mechanisms.

The value of the applied field below which spontaneous self-oscillation does not occur will be termed the threshold value. If the value of the steady electrical field at some point within the body is caused by the action of an input signal to exceed the threshold value for a time shorter than the instability transit time (determined by the length of the body and the velocity of the propagating high field domain) between the two constant areas between which the field is applied, the current passed through the body by the external source of potential difference will undergo a single excursion from its ohmic current value to provide an output pulse giving power gain. Ohmic current value is defined as that value of current due to the electrons being in a low field state.

In order to obtain the form of single pulse operation defined in the preceding paragraph the steady state value of the applied field which is caused by the action of an input signal to exceed the threshold value for a time shorter than the instability transit time must exceed a lower threshold value determined by experiment for a given material and typically between 50 and 75 percent of the threshold value. The steady state field may be continuously applied to may be pulsed to reduce the total power dissipation in the device.

SUMMARY OF THE INVENTION

It is the object of the present invention to provide a scanning system utilizing the aforementioned type of semiconductive material.

In accordance with the present invention, there is provided a solid state scanning system including a body of semiconductive material exhibiting high field instability effects, means for causing a high field domain to propagate along said body, and means for detecting the relief profile of disturbances caused by the propagating high field domain on a surface of the semiconductive body. The body of semiconductive material preferably consists of a piezo-electric semiconductor, for example cadmium sulfide (CdS), ZnO or other II – VI Compounds.

The foregoing and other features according to the invention will be better understood from the following description with reference to the accompanying drawings.

DETAILED DESCRIPTION OF THE PREFERRED EMBODIMENT

Figure 1:
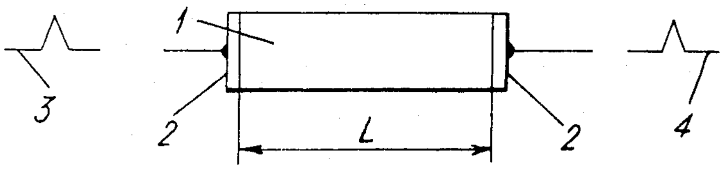
FIG. 1 shows diagrammatically a semiconductor device.

Referring to FIG. 1, the active semiconductor element, for example of a piezo-electric semiconductor material such as cadmium sulfide, consists of a parallel sided body 1 having ohmic contact areas 2 secured to its plain faces at opposite ends. A unidirectional current source (connections to which are shown in the drawing) is used to apply a potential difference of controllable value between the contact areas 2, and the output circuit connected to one contact area would be arranged to extract any oscillatory component of the current flowing in the body 1.

The phenomenon referred to in preceding paragraphs manifests itself by the appearance in the output circuit (not shown in the drawing) of an oscillatory component in the current through the body 1 when the potential difference applied across the crystal from the unidirectional current source exceeds a critical value, the self-oscillatory frequency being directly related to the length L (typically 1 cm for CdS) of the body 1 and being of the order of 0.2 MHz.

Generally, in practice, the potential difference applied between the contact areas 2 is a fraction, determined by experiment, of the potential necessary to cause self-oscillation. The potential difference is chosen so that an oscillatory waveform or trigger pulse superimposed on it by an external source carries the body 1 into its self-oscillatory condition for short intervals of time during each cycle of the input frequency. In other words the peak value of the oscillatory signal voltage is caused to be just sufficient to raise the electric field within the crystal above the threshold value. Under these conditions it is found that each triggering of the body 1 by the peak of a trigger pulse 3 for example, causes a sharp current pulse 4, drawing power from the potential source, to appear in the output circuit. Thus an oscillatory waveform applied to the device will cause a corresponding train of sharp current pulses to appear at the output. The operation of the device is virtually independent of frequency provided that the self-oscillatory frequency is at no time exceeded. The power output available from the device depends on the dissipation permissible within the body 1. The output power may amount to several watts, but since the efficiency is relatively low this will involve a relatively high dissipation within the body. The driving potential may be pulsed to reduce the standing dissipation.

The semiconductor device according to FIG. 1 can also be operated by applying between the contact areas 2 a potential difference greater than the threshold value thereby causing self-oscillation. In this mode of operation the device would give a continuous series of output pulses without the need for further external triggering.

When the semiconductor device is over-driven, most of the voltage which is extra to that required to establish the high field domain, i.e., the voltage which is in excess of the threshold value for the device, appears across the high field domain. If, for example, a 100 volts are needed to establish the high field domain within the device and a mean level of the order of 150 volts is applied across the device then of this, approximately 80 volts would appear across the high field domain. If now a modulation of $\pm$ 10 volts were superimposed on the 150 volts the high field domain voltage would vary from 70 volts to 90 volts as the high field domain propagated along the device and the output of the device as detected across the device would also be modulated by the same or proportional amount. It should be noted that if the device is over-driven for example, to a value of three or four times the threshold value the high field domain would take up some of the extra voltage until a point is reached where impact ionization occurs. Impact ionization limits the spread of the high field region, thus the additional bias or external source of potential difference is taken up by the bulk of semiconductive material outside the high field domain and would lead to the formation of a further domain. Thus it can be seen that there is a limit to the amplitude of the modulating voltage.

With piezo-electric semiconductor materials, for example, cadmium sulfide, the intense phonon flux associated with a high field domain nucleated therein is such that it causes the surfaces of the semiconductor material to be disturbed during propagation by an amount which is related to the voltage across the high field domain. Thus modulation of the voltage across the high field domain during propagation would result in a modulation of the relief profile of the disturbances by the same or proportional amount.

The ability to modulate the voltage across a high field domain and the corresponding modulation of the relief profile of the disturbances may be employed in several applications and in particular is employed in a solid state scanning system according to the invention.

Figure 2:
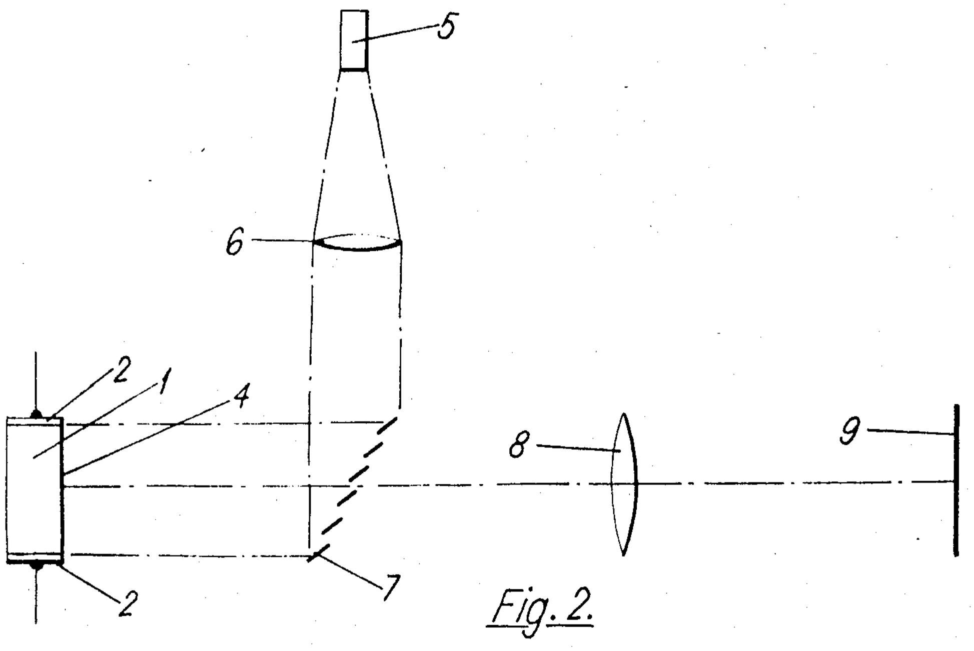
FIG. 2 diagrammatically illustrates a solid state scanning system according to the invention.

The solid state scanning system according to the invention, which is diagramatically illustrated in FIG. 2 of the drawings, utilizes a Schlieren optical system to detect the relief profile of the disturbances.

Referring to FIG. 2, light from a light source 5 is directed via an equiconvex lens 6 onto a set of louvered mirror strips 7. Each of the mirror strips 7 causes a strip of light to be incident on a surface 4 of the body 1 and when the surface 4 is quite flat, i.e., in the absence of a propagating high field domain, the emergent strip of light is directed back onto the associated mirror strip and therefore no light passes through the clear spaces in the louvered strips. Therefore, under these conditions, no light will be directed to a display screen 9 via the systems projection system which is indicated in the drawing by an equiconvex lens 8. However, any of the strips of light emergent from areas of the surface 4 which are not flat, i.e., disturbed by the presence of a high field domain, will be passed, at least in part, through the clear spaces in the louvered strips thereby causing those strips of light to be displayed, at least in part, as a raster of brightness information on the screen 9. The amount of light passed through the louvered strips 7 is dependent upon the displacement of the louvered strips from the surface 4 and the amount by which the surface 4 is disturbed when the strips of light from the strips 7 are incident thereon.

Thus in practice, the width of the strips 7, the spaces between the strips 7, and the displacement of the strips 7 from the surface 4 are arranged such that, for a maximum possible disturbance at the surface 4, an emergent strip of light associated with this disturbance is deflected by an amount such that the complete strip of light is passed through a clear space in the louvered strips and for a minimum disturbance, i.e., a substantially flat surface 4, no light is passed through the clear spaces in the louvered strips. Therefore the amount of each strip of light which is passed through the louvered strip and displayed on the screen 9 is directly related to the degree of the disturbance at that area of the surface 4 from which it emerges.

Alternatively, the body 1 can be inclined at an angle relative to the louvered strips 7 in a manner such that, for a minimum disturbance, the associated strip of light passes through a clear space in the louvered strips and, for a maximum disturbance, no light passes through the clear spaces.

Thus in operation, a high field domain propagating in the body 1 between the spaced contact areas 2 will cause, for a constant voltage across the high field domain, a relief profile along the surface 4 which varies in a regular manner thereby causing the same amount of each strip of light to be passed through the louvered strips and displayed on the screen 9.

The electrical field within the body 1 can be caused to exceed the threshold value in order to nucleate the high field domain, either by continuously applying a potential difference between the contact areas 2 which is in excess of the threshold value or by applying a potential difference which is a fraction of the potential necessary to cause self-oscillation and then superimpose on it a trigger pulse to cause the threshold value to be exceeded.

Modulation of the voltage across the high field domain during propagation, by for example a video signal, will, as outlined in a preceding paragraph, result in a modulation of the relief profile of the disturbances at the surface 4 by the same or proportional amount. Thus the raster of brightness information displayed on the screen 9 will also be modulated by the same or proportional amount and will therefore be representative of the modulating video signal.

The mode of operation for the semiconductor device, i.e., whether the potential difference applied between the contact areas 2 is continuously applied or triggered, depends on the synchronization requirements between the propagation time for the high field domain and the input rate of the high field domain modulating signals.

For example, when the potential difference is continuously applied between the contact areas 2, then when the high field domain has propagated the full length of the body 1 another high field domain will be nucleated. By this time the system arrangement will be such that the next modulating signal will be applied to the semiconductor device.

There are several ways in which the surface disturbances can be enhanced if it is desired to give a greater deflection of the strips of light. The surface 4 can, for example, include a layer of a material of high coupling constant, such as lithium niobate ($LiNbO_3$), to give a greater deformation at its outer surface for a give field voltage.

Alternatively, it may be desirable to introduce some memory into the writing process, for example, lasting one frame or one line, and this can be effected by providing a liquid or plastic film at the surface 4.

It is to be understood that the foregoing description of specific examples of this invention is made by way of example only and is not to be considered as a limitation on its scope.

What is claimed is:

1. A solid state scanning system comprising a body of semiconductive material exhibiting high field instability effect and corresponding surface disturbances, means for causing a high field domain to propagate along said body, and means for detecting the relief profile of said disturbances caused by the propagating high field domain on a surface of said semiconductive body.

2. A system as claimed in claim 1 wherein said means for causing a high field domain includes means for modulating the voltage across said semiconductor body.

3. A system as claimed in claim 2 in which said semiconductive body is of a piezo-electric semiconductor material.

4. A system as claimed in claim 2 wherein said detecting means includes a source of light and means for directing said light onto said surface and for sensing changes in the angle of reflection of said light from said surface.

5. A system as claimed in claim 4 wherein said surface of said semiconductive body includes a layer of a material for enhancing the surface disturbances.

6. A system as claimed in claim 4 in which the surface of the semiconductive body is provided with a layer of a material for providing a memory effect of the surface disturbances.

7. A system as claimed in claim 4 wherein said means for directing light and sensing changes in reflection includes a plurality of louvered mirror strips having predetermined spacing therebetween.

8. A system as claimed in claim 7 including a display screen for displaying a raster of brightness information from said louvered strips.

* * * * *